Sept. 29, 1942.  C. J. MORGAN  2,297,067
EGG CLEANING MACHINE
Filed Feb. 4, 1941   3 Sheets-Sheet 2
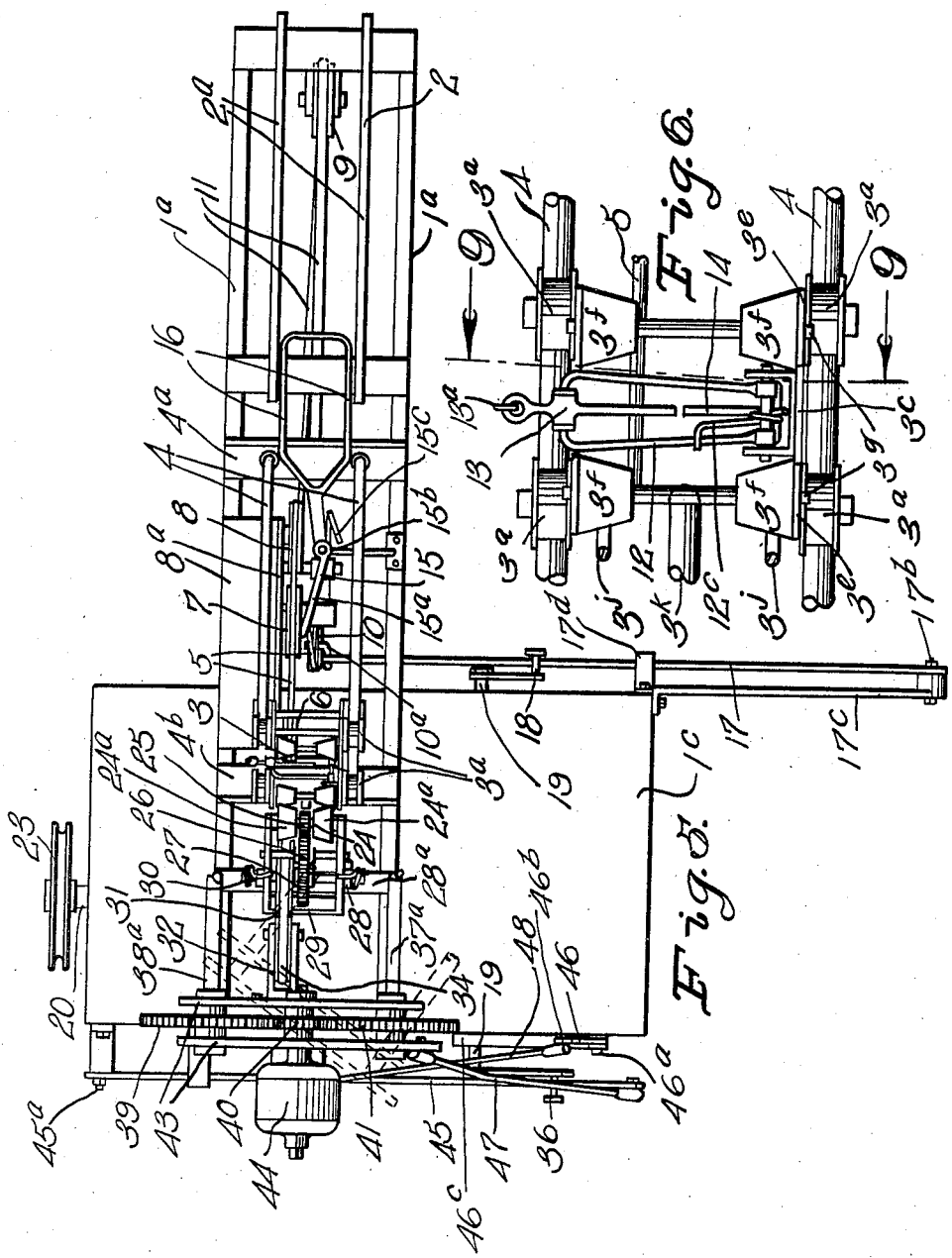
INVENTOR.
Conrad J. Morgan
BY  W. B. Bowman
ATTORNEY.

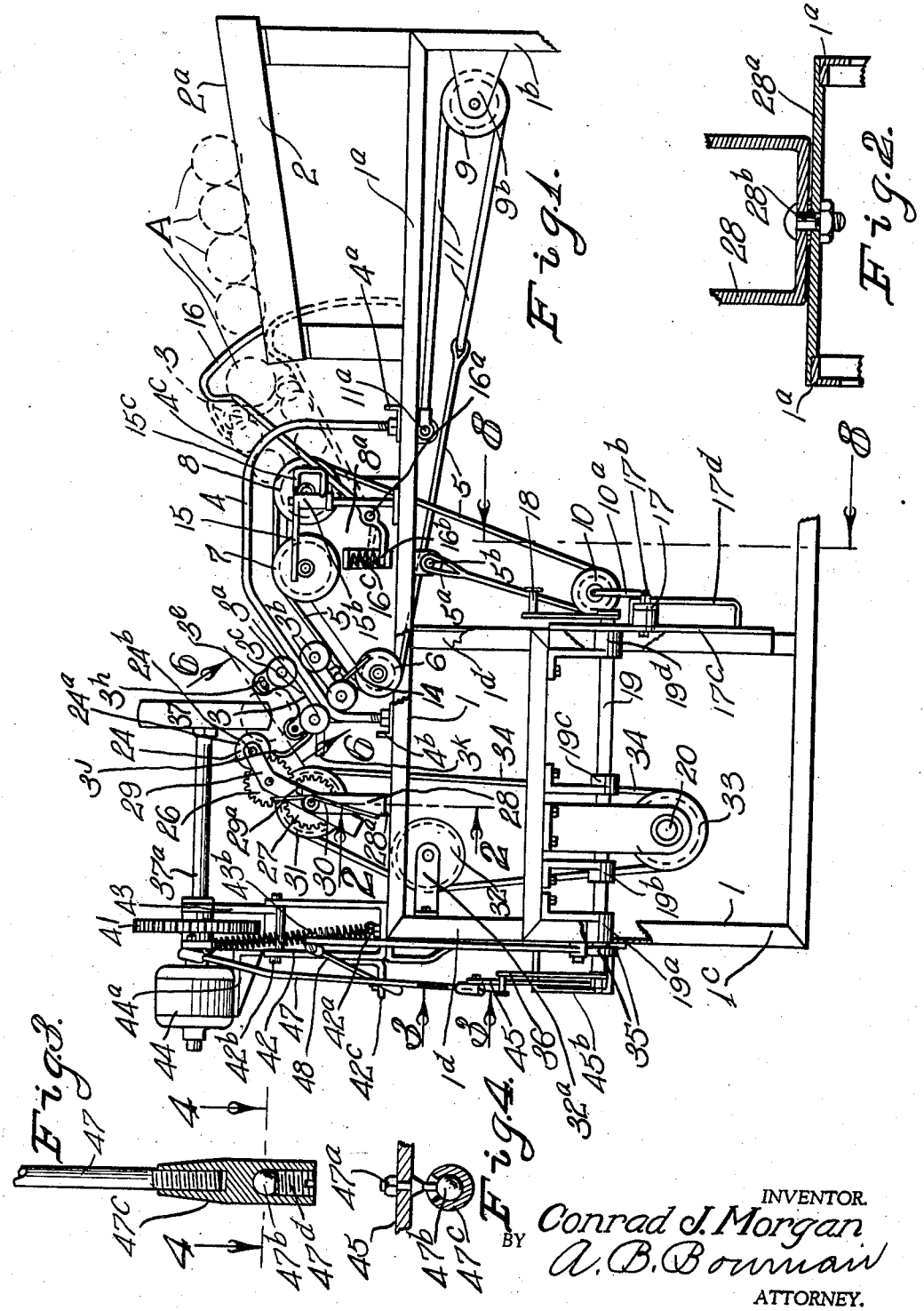

Sept. 29, 1942.  C. J. MORGAN  2,297,067
EGG CLEANING MACHINE
Filed Feb. 4, 1941  3 Sheets-Sheet 3
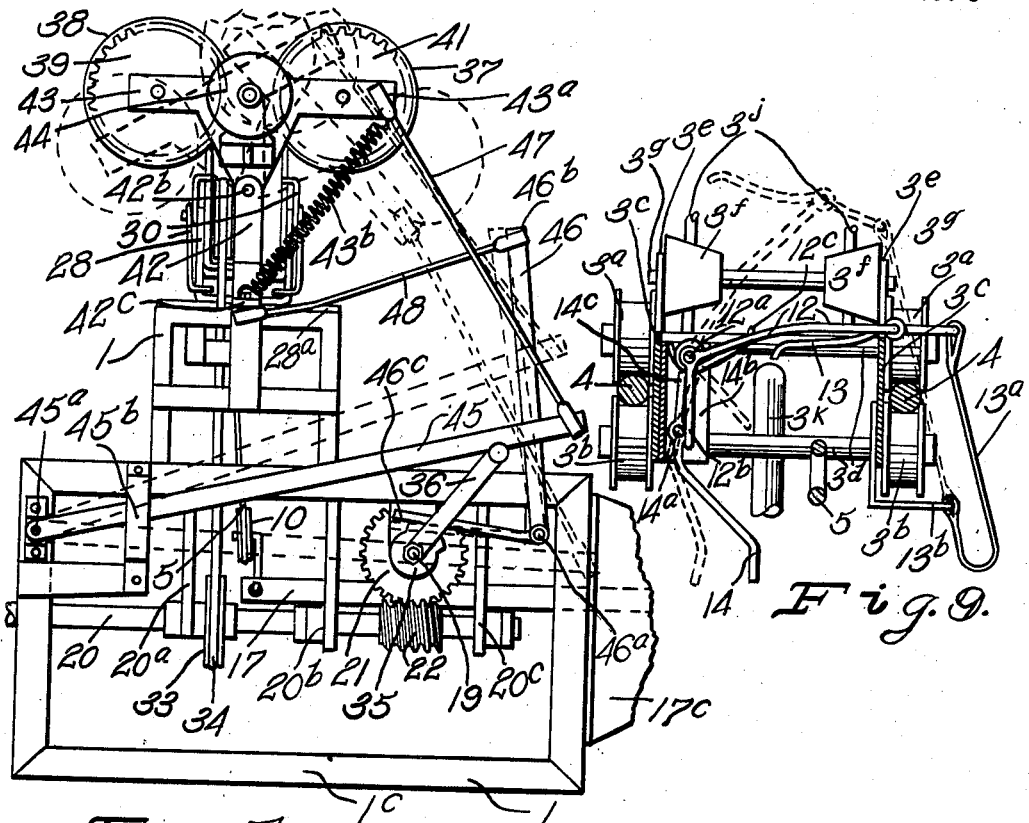
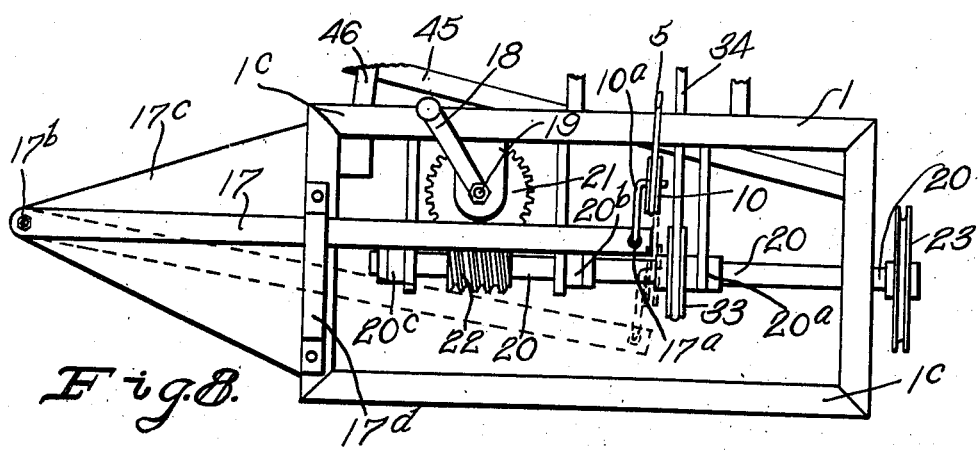
INVENTOR.
BY Conrad J. Morgan
A. B. Bowman
ATTORNEY.

Patented Sept. 29, 1942

2,297,067

UNITED STATES PATENT OFFICE 2,297,067

EGG CLEANING MACHINE

Conrad J. Morgan, National City, Calif.

Application February 4, 1941, Serial No. 377,326

18 Claims. (Cl. 146—198)

My invention relates to an egg cleaning machine, more particularly a machine which is substantially automatic in performing the complete operation of cleaning the outer surfaces of poultry eggs without washing the same and the objects of my invention are:

First, to provide an egg cleaning machine of this class in which eggs are thoroughly and substantially automatically cleaned without reducing the thickness or strength of the shells of said eggs;

Second, to provide an egg cleaning machine of this class in which the number of eggs broken during the cleaning operation thereof is reduced to a minimum;

Third, to provide an egg cleaning machine of this class in which eggs being cleaned thereby are revolved and thoroughly brushed by soft rotary brushes completely cleaning the entire outer surfaces of said eggs;

Fourth, to provide an egg cleaning machine of this class in which the eggs being cleaned thereby are continually revolved while soft rotating brushes are shifted over the outer contours of the egg from end to end thereof thoroughly brushing and cleaning the ends of the egg, as well as the side portions thereof;

Fifth, to provide an egg cleaning machine of this class in which the cleaning brushes do not act as abrasive elements whereby the eggshells on the egg are not reduced in thickness and the air surrounding my egg cleaning machine is not laden with harmful eggshell dust;

Sixth, to provide an egg cleaning machine of this class in which eggs are automatically carried from a stationary feed rack to rotary cleaning brushes and then carried from said brushes and ejected from my egg cleaning machine;

Seventh, to provide an egg cleaning machine of this class in which compensation is automaticaly made for varying contours of varying eggs when cleaning the same and compensation is also automatically made for reversal of the longitudinal disposition of the eggs in my egg cleaning machine;

Eighth, to provdie an egg cleaning machine of this class which thoroughly cleans the small recesses in the outer surface of egg shells;

Ninth, to provide a novel egg cleaning machine of this class; and

Tenth, to provide an egg cleaning machine of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a framentary side elevational view of my egg cleaning machine showing by dash lines varying positions of parts and portions thereof; Fig. 2 is an enlarged fragmentary sectional view taken from the line 2—2 of Fig. 1 showing parts in elevation to facilitate the illustration; Fig. 3 is an enlarged fragmentary sectional view taken from the line 3—3 of Fig. 1 showing parts and portions in elevation to facilitate the illustration; Fig. 4 is a fragmentary sectional view taken from the line 4—4 of Fig. 3 showing parts and portions in elevation to facilitate the illustration; Fig. 5 is a top or plan view of my egg cleaning machine; Fig. 6 is an enlarged fragmentary sectional view taken from the line 6—6 of Fig. 1; Fig. 7 is a fragmentary end elevational view of my egg cleaning machine showing by dash lines varying positions of parts and portions thereof; Fig. 8 is a fragmentary sectional view taken from the line 8—8 of Fig. 1 showing by dash lines varying positions of parts and portions of my egg cleaning machine; and Fig. 9 is a fragmentary sectional view taken from the line 9—9 of Fig. 6 showing by dash lines varying positions of parts and portions of my egg cleaning machine.

Similar characters of reference refer to similar parts and portions throughout the several views of the drawings:

The main frame 1, egg feed rack 2, egg carriage 3, egg carriage track members 4, carriage operating cable 5, carriage operating pulleys 6, 7, 8, 9 and 10, carriage operating resilient cable 11, egg ejector members 12 and 13, ejector trip lever 14, trip lever cam member 15, egg retaining lever 16, carriage operating lever 17, cam member 18, shafts 19 and 20, worm gear 21, worm pinion 22, main drive pulley 23, egg turning roller 24, egg turning roller operating gears 25, 26 and 27, egg turning roller supporting brackets 28 and 29, bracket operating springs 30, egg turning roller operating pulleys 31, 32 and 33, egg turning roller operating belt 34, cam members 35 and 36, brushes 37 and 38, brush operating gears 39, 40 and 41, brush supporting brackets 42 and 43, brush operating motor 44, brush shifting levers 45 and 46 and the link members 47 and 48 constitute the principal parts and portions of my egg cleaning machine.

The main frame member 1, as shown in Fig. 1 of the drawings, is provided with a horizontally disposed portion 1a which is supported by legs 1b at its one end and is supported by the rectangular frame portion 1c at its other end. Extending upwardly from this rectangular frame portion 1c and into engaged connected relation with the horizontally disposed frame portion 1a are leg portions 1d, all as shown best in Fig. 1 of the drawings.

Positioned on the upper side of the frame portion 1a near its one end is the egg feed rack 2. This egg feed rack 2 is provided with two inclined members 2a, as shown best in Figs. 1 and 5 of the drawings. These inclined members 2a, are positioned in spaced relation from each other, as shown in Fig. 5 of the drawings and are arranged to support eggs thereon, as indicated by dash lines A in Fig. 1 of the drawings, which dash line A indicate the cross sectional shape of eggs supported on the inclined members 2a. Eggs supported on the egg feed rack 2 in the relation as indicated by the dash line A, in Fig. 1 of the drawings, tend to roll downwardly thereon toward the egg retaining lever 16, all as shown best in Fig. 1 of the drawings.

The egg carriage 3 is arranged to pass backwardly and forwardly on the egg carriage track members 4, as indicated by solid and dash line in Fig. 1 of the drawings. This egg carriage 3 is provided with four rollers on each side thereof, as shown best in Fig. 1 of the drawings. The rollers 3a of the egg carriage 3 are positioned in engaged relation with the upper side of the egg carriage track members 4, as shown best in Figs. 1 and 9 of the drawings. This egg carriage 3 is also provided with a pair of rollers 3b on each side thereof arranged in opposed relation to the rollers 3a on the lower sides of the egg carriage track members 4, all as shown best in Figs. 1 and 9 of the drawings. This egg carriage 3 is provided with plate-like frame members 3c at opposite sides in adjacent relation with the rollers 3a and 3b. Interconnecting the frame members 3c are axle members 3d on the opposite ends of which are revolubly mounted the rollers 3a and 3b, as shown best in Fig. 9 of the drawings. Each of the frame members 3c is provided with upwardly extending portions 3e. Revolubly mounted in these upwardly extending portions 3e of the frame members 3c are egg retaining rollers 3f, all as shown best in Figs. 1, 6, and 9 of the drawings. These rollers 3f are preferably covered with soft resilient material such as soft rubber or the like. The extending ends 3g of the shafts on which the egg retaining rollers 3f are mounted extend through the portions 3e of the frame members 3c, as shown best in Figs. 6 and 9 of the drawings. One of the egg retaining rollers 3f at the extending end portion 3g of its central shaft is shiftably mounted in elongated slotted portions 3h in two of the upwardly extending portions 3e of the frame member 3c, as shown best in Fig. 1 of the drawings. This transversely shiftable relation of one of the rollers 3f provides compensation means for various size eggs and varying contours of the outer surfaces of the eggs retained by and between said egg retaining rollers 3f. Secured to the one side of the egg carriage 3 is an upwardly extending bracket 3j which is adapted to prevent the eggs from shifting out of position between the egg retaining rollers 3f when the egg carriage 3 is passing toward the brushes 37 and 38 and the egg turning rollers 24, all as shown best in Fig. 1 of the drawings.

Secured to the egg carriage 3 is the egg carriage operating cable 5. This egg carriage operating cable 5 is connected with one of the axle members 3d, as shown best in Fig. 9 of the drawings and is arranged to extend over the egg carriage operating pulleys 7 and 8 at one side of the egg carriage 3 and this egg carriage operating cable 5 extends over the egg carriage operating pulley 6 at the opposite side of the egg carriage 3 from the egg carriage operating pulley 7, as shown best in Fig. 1 of the drawings. The egg carriage operating cable 5 extends from the pulley 8 downwardly over the pulley 10 and extends upwardly therefrom having its end portion 5a rigidly secured on a pin 5b in connection with the horizontal main frame portion 1a, all as shown best in Fig. 1 of the drawings.

The opposite end of this egg carriage operating cable 5 extends from the pulley 6 and is secured to one end of the carriage operating resilient cable 11. This cable 11 is rigidly secured to a pin 11a, which pin 11a is secured to the horizontally disposed frame portion 1a, as shown best in Fig. 1 of the drawings. This cable 11 is a resilient stretchable cable, preferably made of rubber or metallic spring material and is positioned over the pulley 9 intermediate its ends, as shown best in Fig. 1 of the drawings.

The pulley 9 is rigidly supported in connected relation with the frame member 1 by means of the bracket 9b, all as shown best in Figs. 1 and 5 of the drawings. It will be here noted that the resilient character of the cable 11 tends to hold the egg carriage 3 in substantially the solid line position, as indicated in Fig. 1 of the drawings against the stop member 3k.

It will be observed from Fig. 9 of the drawings that the egg carriage track members 4 are substantially circular in cross section and are positioned in spaced relation from each other in cooperative relation with rollers 3a and 3b at opposite sides of the egg carriage 3, all as shown best in Figs. 1 and 9 of the drawings. The egg carriage track members 4 are secured at opposite ends to the horizontal frame portions 1a by means of the cross members 4a and 4b, as shown best in Figs. 1 and 5 of the drawings. It will be observed from Fig. 1 of the drawings that these egg carriage track members 4 are inclined from the brushes 37 and 38 toward the pulleys 7 and 8 and are both curved in conforming spaced relation with the pulley 8 forming curved portions 4c whereupon the egg carriage 3 passes over the pulley 8 and is disposed in angular relation toward the egg feed rack 2 for receiving eggs therefrom, all as indicated in Fig. 1 of the drawings showing the varying position of the egg carriage 3 by dash lines.

The carriage operating pulley 10 is secured on the carriage operating lever 17 in connection with the opening 17a therein, which is arranged to receive the bracket 10a on which the carriage operating pulley is revolubly mounted. The carriage operating lever 17 is pivotally mounted by means of the bolt 17b in connection with the bracket 17c. This bracket 17c is connected with the rectangular frame portion 1c, all as shown best in Fig. 8 of the drawings. Rigidly secured on the rectangular frame portion 1c of the main frame 1 is a bracket 17d. This bracket 17d is arranged to limit the movement of the carriage operating lever 17 and guide the same when being pivotally shifted on the bolt 17b, as shown best in Figs. 1, 5 and 8 of the drawings. The carriage operating lever 17 is arranged to be pivotally shifted by means of the cam member 18 in connection with the revolubly operated shafts 19 on which is positioned the worm gear 21 in mesh with the worm pinion 22 which is revolubly operated in connection with the shaft 20.

It will be here noted that the carriage operating pulleys 6, 7 and 8 are revolubly mounted on the bracket 8a which is secured on the horizontally disposed frame portion 1a, as shown best in Figs. 1 and 5 of the drawings. The carriage operating pulley 10 being rigidly secured to the extending end of the carriage operating lever 17 is arranged to force the cable over the rollers 7 and 8 and carry the egg carriage 3 past the trip lever cam member 15 which is arranged to engage the ejector trip lever 14, and shift the same into dash line position, as shown in Fig. 9 of the drawings. This ejector trip lever 14 is pivotally mounted on a pin 14a which is supported by a bracket 14b in connection with one of the frame portions 3c of the egg carriage 3, as shown best in Fig. 9 of the drawings.

Pivotally mounted on this bracket 14b is the egg ejector member 12. This egg ejector member 12 is pivotally mounted on the pin 12a and is substantially U-shaped in form as is shown in Fig. 6 of the drawings. Integral with this egg ejector member 12 and positioned below the pin 12a is a downwardly extending lever portion 12b which is engageable with the upwardly extending lever portion 14c of the ejector trip lever 14, as shown best in Fig. 9 of the drawings. Pivotally mounted on the U-shaped end of the egg ejector member 12 is the egg ejector member 13. This egg ejector member 13 is connected with a flexible cord 13a at its outer end, which cord 13a is secured at its lower end to a bracket 13b in connection with the frame member 3c of the egg carriage 3, all as shown best in Fig. 9 of the drawings.

As shown in Fig. 5 of the drawings, the trip lever cam member 15 is arranged in the path of the ejector trip lever 14 for shifting the same to the dash line position, as shown in Fig. 9 of the drawings. As the egg carriage 3 proceeds from the brushes 37 and 38 toward the egg feed rack 2, the downwardly extending end portion of the ejector trip lever 14 engages the angular portion 15a of the trip lever cam member 15 causing said ejector trip lever 14 to shift outwardly past the journal portion 15b of the trip lever cam member 15, whereupon the arm portion 15c guides the ejector trip lever 14 inwardly until the tension of the spring 12b in engagement with the egg ejector member 12, shifts the same and said ejector trip lever 14 backwardly into the solid line position, as shown in Fig. 9 of the drawings.

The egg retaining lever 16 is pivotally mounted on the pin 16a and is maintained in the solid line position, as shown in Fig. 1 of the drawings by the compression spring 16c in engagement with the extending end portion 16b of said egg retaining lever 16, all as shown best in Fig. 1 of the drawings. As shown in Fig. 1 of the drawings, this egg retaining lever 16 is arranged to be engaged by the egg carriage 3 and pivoted to the dash line position, as shown in Fig. 1 of the drawings, whereby one of the eggs, as indicated by dash lines A rolls onto the egg carriage 3 intermediate the egg retaining rollers 3f thereof.

When the egg carriage 3 is positioned in the solid line position, as shown in Fig. 1 of the drawings, the egg turning roller 24 is arranged to rotate the egg retained by the egg retaining rollers 3f, as indicated by dash lines in Fig. 1 of the drawings. This egg turning roller 24 is provided with soft resilient roller portions 24a at its opposite end, which portions 24a are preferably of soft rubber or the like and this egg turning roller 24 is revolubly mounted intermediate the extending ends of the egg turning roller supporting bracket 29, as shown best in Figs. 1 and 5 of the drawings. This egg turning roller 24 is provided with a central shaft 24b on which is rigidly positioned the egg turning roller operating gear 25 which is positioned intermediate the egg engaging roller portions 24a, as shown best in Fig. 5 of the drawings.

In meshed relation with this gear 25 is the gear 26, which is revolubly mounted in a similar manner in connection with the bracket 29, as is the egg turning roller 24. Revolubly mounted in connection with the bracket 29 in meshed relation with the gear 26 is the egg turning roller operating gear 27. This gear 27 is arranged in fixed revoluble relation with the egg turning roller operating pulley 31 engaging the egg turning roller operating belt 34. This belt 34 is positioned over the pulley 33 on the shaft 20 and is positioned over the pulley 32 intermediate the pulleys 31 and 33, all as shown best in Fig. 1 of the drawings. The pulley 32 is rigidly mounted in connection with the main frame 1 by means of the bracket 32a.

The egg turning roller supporting bracket 28 is a substantially U-shaped bracket member supported on the upper side of the frame portions 1a by means of a cross member 28a which is arranged in interconnected relation with opposite side portions of the horizontally disposed portions 1a of the main frame 1, as shown best in Fig. 2 of the drawings. This bracket 28 is pivotally mounted at its middle portion on a bolt 28b which extends through the cross member 28a, all as shown best in Fig. 2 of the drawings. This pivotally mounted relation of the bracket 28 in connection with the main frame portions 1a provides a shifting relation of the egg turning roller 24 with the egg carriage 3 providing a means arranged to compensate for various contours of eggs in the egg carriage 3 and also for reverse longitudinally disposed relation of eggs in said egg carriage 3 and in adjacent operative relation with said egg turning rollers 24, all as shown best in Figs. 1 and 2 of the drawings. The bracket operating springs 30 in connection with the brackets 28 and 29 tend to force the bracket 29 downwardly toward the egg carriage 3 for frictional engagement of the egg turning roller 24 with the eggs in the egg carriage 3, all as shown best in Fig. 1 of the drawings.

It will be noted that the bracket 29 is provided with a stop member 29a arranged to engage the upper end of the bracket 28 limiting the downward movement of the egg turning roller 24 in connection with said bracket 29. The shaft 20 is revolubly operated by means of the main drive pulley 23 in connection with a motor or the like, not shown. This shaft 20 is journalled in the journal brackets 20a, 20b and 20c, all as shown best in Figs. 7 and 8 of the drawings. The worm pinion rigidly mounted on this shaft 20 is arranged to revolubly operate the worm gear 21 in connection with the shaft 19 and the cam member 18 and 36. The pulley 33 is fixed on this shaft 20 and is arranged to operate the egg turning roller 24 by means of the belt 34 and the gears 25, 26 and 27, as hereinbefore described. It will be here noted that the egg turning roller 24 operates at fairly high speed due to the geared relation of the small gear 25 relatively with the larger gear 26 in mesh with a still larger gear 27.

The shaft 19 is journalled in the journal brackets 19a, 19b, 19c and 19d, as shown best in Fig. 1 of the drawings. It will be here noted that the brackets 19a, 19b, 19c and 19d are each rigidly connected with the main frame 1.

The brush supporting bracket 42 is a substantially U-shaped bracket member pivotally mounted in connection with the main frame 1 on the bolt 42a, as shown best in Fig. 1 of the drawings.

Pivotally connected with this brush supporting bracket 42 by means of the pin 42b is the brush supporting bracket 43, as shown best in Figs. 1 and 7 of the drawings. The brush supporting bracket 43 is provided with bifurcated portions arranged in upwardly extending relation and substantially T-shaped in form as shown best in Figs. 1 and 7 of the drawings.

Secured on this brush supporting bracket 43 at one side thereof by means of the angular bracket 44a is the brush operating motor 44. Secured on the operating shaft of this brush operating motor 44 is the brush operating gear 40 which is a relatively small gear acting as a pinion intermediate the larger brush operating gears 39 and 41 which are in meshed relation with said brush operating gear 40 and are arranged to revolve the brush supporting shaft members 37a and 38a, as shown best in Fig. 5 of the drawings.

It will be noted that the gears 39 and 41 are in rigid connected relation with the brush supporting shaft 38a and 37a respectively, which shafts 37a and 38a are revolubly mounted in the bifurcated portion of the brush supporting bracket 43 whereby said gears 39 and 41 are interposed between said bifurcated portions of the brush supporting bracket 43, all as shown best in Fig. 5 of the drawings.

Rigidly connected with the extended ends of the shafts 37a and 38a are the brushes 37 and 38, as shown best in Figs. 1 and 7 of the drawings. These brushes 37 and 38 are arranged to be positioned in tandem relation slightly above the egg carriage 3, as shown in the solid line position in Fig. 1 and near the egg turning roller 24. These brushes 37 and 38 are soft and are preferably made of fine resilient wire bristles arranged in substantially radiating position around the middle of each of said brushes 37 and 38.

The brush shifting lever 45 is pivotally mounted on a pin 45a which is rigidly secured to the main frame 1, as shown best in Figs. 5 and 7 of the drawings. This brush shifting lever 45 is provided with a guide bracket 45b, as shown best in Figs. 1, 5 and 7 of the drawings. This brush shifting lever 45 is arranged to be engaged on its under side edge by the cam member 36 which is revolubly operated by the shaft 19.

The link member 47 is arranged to interconnect the extending end of the brush shifting lever 45 and the extending arm portion 43a of the brush supporting bracket 43, as shown best in Fig. 7 of the drawings. The brush shifting lever 46 is pivotally mounted on a pin 46a and is provided with an upwardly extending end portion 46b with which is connected the link member 48. The opposite end of this link member 48 is connected with an outwardly extending bracket portion 42c of the brush supporting bracket 42, as shown best in Figs. 1 and 7 of the drawings. The brush shifting lever 46 is provided with an angularly extending end portion 46c which is arranged to engage the cam member 35, as shown best in Fig. 7 of the drawings. As indicated by dash lines in Fig. 7 of the drawings, the cam members 35 and 36 are arranged to shift the brush shifting levers 46 and 45 respectively. It will be here noted that opposite ends of each of the link members 47 and 48 are provided with ball and socket connection means, as shown best in detail in Figs. 3 and 4 of the drawings. As shown in Fig. 4 of the drawings, the brush shifting lever 45 near its one end is arranged to receive the bolt shank portion 47a of the ball joint member 47b. This ball joint member 47b is positioned in a ball socket member 47c which is rigidly connected to the main shank portion of the link member 47, as shown best in Fig. 3 of the drawings. Screwthreaded in one end of this socket member 47c is a plug 47d which is arranged to retain the ball joint member 47c in substantially the position as shown in Fig. 3 of the drawings. This ball and socket joint means at opposite ends of each of the link members 47 and 48 provide for angular shifting relation of the link members 47 and 48 with the brush shifting levers 45 and 46 respectively and the brackets 43 and 42 respectively.

Interconnecting the extending arm portion 43a of the brush supporting bracket 43 and the bolt 42a of the brush supporting bracket 42 is a tension spring 43b, which tends to force the brush supporting bracket 43 toward the end portion 46b of the brush shifting lever 46, as shown in Fig. 7 of the drawings. As shown in Fig. 5 of the drawings, the dash line position of the brush operating shaft 37a and 38a illustrate the position taken by the brush supporting brackets 42 and 43 when the brush shifting lever 46 operated by the cam member 35 pivots the brush supporting bracket 42 on the bolt 42a.

The operation of my egg cleaning machine is substantially as follows: The egg feed rack 2 is loaded with eggs as indicated by dash line A in Fig. 1 of the drawings. The revoluble operation of the shaft 20 is started by means of a motor in connection with the main drive pulley 23, which motor is not shown. As the shaft 20 turns, the pulley 33 engaging the belt 34 revolve the pulley 31 operating the gears 25, 26 and 27 together with the egg turning roller 24 providing relatively high speed revoluble operation of said egg turning roller 24. The brush operating motor 44 in connection with the brush operating gears 39, 40 and 41 revolves the brushes 37 and 38. The worm pinion 22 on the shaft 20 in meshed relation with the worm gear 21 revolves the shaft 19, together with the cam members 18, 35 and 36. When the egg carriage 3 is positioned in the solid line position of Fig. 1, the brushes 37 and 38 impart rotary brushing action on the outer surface of the egg in said egg carriage 3. It will be observed in reference to Fig. 7 of the drawings, that the brush shifting lever 45 operated by the cam member 36, shifts the brush supporting bracket 43 by means of the link member 47 into various dash line positions from one end to the other of the egg in the egg carriage 3. The shifting of said brushes over the outer curved contours of the egg is accomplished by the pivoted relation of the brush supporting bracket 43 on the pin 42b, as shown best in Fig. 7 of the drawings. While the brushes 37 and 38 are brushing and cleaning the outer surface of the egg, said egg is revolved in the egg carriage 3 by means of the egg turning roller 24 in engagement with said egg. The rollers 3f of the egg carriage 3 provide relatively free and easy revoluble operation of said egg in the egg carriage 3. After the egg has been thoroughly cleaned, the brush supporting brackets 42 and 43 are pivotally shifted on the bolt 42a to the dash line position, as shown in Fig. 5 of the drawings by means of the tension spring 43b acting against the cam member 36 in its downward revoluble movement beneath the brush shifting lever 45. The egg carriage 3 is then shifted on the egg carriage track member 4 toward the egg feed rack 2 by means of the cam member 18 which engages the upper side of the carriage shifting lever 17 and forces the same downwardly to the dash line position, as shown in Fig. 8 of the drawings. When the carriage shifting lever 17 is forced downwardly to the dash line position, as indicated in Fig. 8 of the drawings, the carriage 3 is positioned in substantially the dash line position adjacent the lower end of the egg feed rack 2, as shown in Fig. 1 of the drawings. When the egg carriage 3 is thus positioned it is in engagement with the egg retaining lever 16 and holding the same beneath the upper side of the egg feed rack 2 permitting an egg to pass downwardly into the egg carriage 3 intermediate the rollers 3f thereof. The cam member 18 then releases the carriage shifting lever 17 gradually and permits the resilient cable 11 to shift the egg carriage backwardly toward the brushes 37 and 38 by means of the cable 5. It will be here noted that as the egg carriage 3 passes toward the egg feed rack 2 from the brushes 37 and 38 carrying a clean egg therein, the ejector trip lever 14 engages the trip lever cam member 15, as hereinbefore described, shifting the egg ejector member 12 and 13 into the dash line position, as shown in Fig. 9 of the drawings, ejecting the cleaned egg from the egg carriage 3 over the one side of the egg carriage 3 and into a conveyor, which is not shown and is no part of my present invention. It will be here noted that as the egg carriage 3 receives an egg from the egg feed rack 2 and proceeds backwardly toward the brushes 37 and 38, the egg retaining lever 16 passes upwardly intermediate the egg carried by the egg carriage 3 and the adjacent oncoming egg passing downwardly on the upper side of the egg feed rack 2. This egg retaining lever 16 holds the eggs on the egg feed rack 2 and prevents them from passing downwardly over the lower end thereof when the egg carriage 3 is not in proper position to receive one of said eggs from the egg feed rack 2, as indicated by solid lines in Fig. 1 of the drawings. It will be readily understood that my egg cleaning machine is substantially automatic. The only manual act required in the operation thereof is placing the eggs on the egg feed rack 2, the eggs thereafter, being handled entirely by my egg cleaning machine and ejected therefrom.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an egg cleaning machine of the class described, the combination of an egg carriage, spaced egg retaining idler rollers on said carriage arranged to support an egg therebetween, a separate revolubly operated egg turning roller arranged to engage said egg at its opposite side and revolve said egg on said egg retaining rollers, revoluble brush means engageable with said egg and means for longitudinally shifting the same over the outer surface of said egg, and track means arranged to support said egg carriage and means for shifting said egg carriage on said track means.

2. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg longitudinally shiftable over the outer surface of said egg, track means arranged to support said egg carriage, means for shifting said egg carriage on said track means, and an egg feed rack near one end of said track means arranged to feed eggs onto said egg carriage.

3. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, and an egg feed rack near one end of said track means arranged to feed eggs onto said egg carriage, said egg turning rollers positioned near the opposite end of said track means from said egg feed rack.

4. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage means for shifting said egg carriage on said track means, an egg feed rack near one end of said track means arranged to feed eggs onto said egg carriage, said egg turning rollers positioned near the opposite end of said track means from said egg feed rack, and cam and lever means for shifting said egg carriage on said track means.

5. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, an egg feed rack near one end of said track means arranged to feed eggs onto said egg carriage, said egg turning rollers positioned near the opposite end of said track means from said egg feed rack, and cable and pulley means for shifting said egg carriage on said track means.

6. In an egg cleaning machine of the class described, the combination of an egg carriage, spaced egg retaining rollers arranged to support an egg therebetween, track means on which said egg carriage is shiftably mounted, egg ejector means positioned between and below said egg retaining rollers and mounted in connection with said egg carriage and stationarily mounted ejector trip means positioned intermediate the ends of said track means arranged to engage and operate said egg ejector means when said egg carriage passes said ejector trip means.

7. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, and pivotally mounted bracket means arranged to support said egg turning rollers and resilient means in connection with said bracket means tending to force said egg turning roller toward said egg in said egg carriage.

8. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, and bracket means arranged to support said egg turning roller pivotally mounted on an axis at right angles to the axis of said egg retaining rollers.

9. In an egg cleaning machine of the class described, the combination of an egg carriage, spaced egg retaining idler rollers on said carriage arranged to support an egg therebetween, a separate revolubly operated egg turning roller arranged to engage said egg at its opposite side and revolve said egg on said egg retaining rollers, revoluble brush means engageable with said egg and means for longitudinally shifting the same over the outer surface of said egg, and pivotally mounted brush supporting brackets arranged to support said brushes.

10. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, pivotally mounted brush supporting brackets arranged to support said brushes, and means for pivotally shifting one of said brush supporting brackets on a horizontal axis transversely disposed to the axis of said egg retaining rollers.

11. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, pivotally mounted brush supporting brackets arranged to support said brushes, means for pivotally shifting one of said brush supporting brackets on a horizontal axis transversely disposed to the axis of said egg retaining rollers, and means for pivotally shifting both of said brush supporting brackets on a vertically disposed axis arranged in transverse relation with the axis of said egg retaining rollers.

12. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, pivotally mounted brush supporting brackets arranged to support said brushes, a stationary revolubly operated shaft, and lever and cam means in connection therewith arranged to shift said brush supporting bracket.

13. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, and means for shifting said egg carriage on said track means, said means for shifting said egg carriage including cam and lever means arranged to shift said egg carriage in one direction on said track means.

14. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, said means for shifting said egg carriage including cam and lever means arranged to shift said egg carriage in one direction on said track means, and means in connection with said shaft for operating said egg turning roller.

15. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, and an egg feed rack near one end of said track means arranged to feed eggs onto said egg carriage, and egg retaining means arranged to stop the shifting of eggs on said egg feed rack when said egg carriage is out of receiving position relatively with said egg feed rack.

16. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, said means for shifting said egg carriage including cam and lever means arranged to shift said egg carriage in one direction on said track means, and resilient tension means in connection with said egg carriage tending to force the same in the opposite direction.

17. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, said means for shifting said egg carriage including cam and lever means arranged to shift said egg carriage in one direction on said track means, resilient tension means in connection with said egg carriage tending to force the same in the opposite direction, and a cable connected with said resilient means at one end and connected with said cam and lever means at its opposite end.

18. In an egg cleaning machine of the class described, the combination of an egg carriage, spaced egg retaining rollers on said carriage arranged to support an egg therebetween, a revolubly operated egg turning roller arranged to engage and revolve said egg on said egg retaining rollers, revoluble brush means engageable with said egg and longitudinally shiftable over the outer surface of said egg, track means arranged to support said egg carriage, means for shifting said egg carriage on said track means, said means for shifting said egg carriage including cam and lever means arranged to shift said egg carriage in one direction on said track means, resilient tension means in connection with said egg carriage tending to force the same in the opposite direction, and a cable connected with said resilient means at one end and connected with said cam and lever means at its opposite end, said cable secured to said egg carriage intermediate the ends of said cable.

CONRAD J. MORGAN.